United States Patent [19]
Ashauer et al.

[11] 4,037,492
[45] July 26, 1977

[54] BEARING ARRANGEMENT FOR AXLE OR SHAFTS PROVIDED WITH ROTATING GEARS IN A DIFFERENTIAL GEAR BOX

[75] Inventors: Karl Ashauer, Wolfsburg; Hansjörg Mihatsch, Gifhorn, both of Germany

[73] Assignee: Volkswagenwerk Aktiengesellschaft, Germany

[21] Appl. No.: 629,030

[22] Filed: Nov. 5, 1975

[30] Foreign Application Priority Data

Nov. 14, 1974 Germany .......................... 2454067

[51] Int. Cl.² .......................... F16H 1/38; F16H 1/40
[52] U.S. Cl. .......................... 74/710; 74/713
[58] Field of Search .......................... 74/710, 710.5, 711, 74/713, 714, 715; 308/238, 239, 35, 240

[56] References Cited

U.S. PATENT DOCUMENTS

| | | | |
|---|---|---|---|
| 2,463,091 | 3/1949 | Dortort | 74/711 |
| 2,873,622 | 2/1959 | Nash | 74/711 |
| 3,220,786 | 11/1965 | McCutchen | 308/240 |
| 3,348,887 | 10/1967 | Sheps | 308/238 X |
| 3,402,801 | 9/1968 | Holdeman | 192/107 |
| 3,655,248 | 4/1972 | Hirs | 308/240 X |
| 3,920,293 | 11/1975 | Takeuchi | 308/238 |
| 3,930,424 | 1/1976 | Myers, Sr. | 74/711 |

*Primary Examiner*—Samuel Scott
*Assistant Examiner*—Lance W. Chandler
*Attorney, Agent, or Firm*—Brumbaugh, Graves, Donohue & Raymond

[57] ABSTRACT

A differential gear box containing rotatable gears mounted on shafts extending through the gear box includes bearing rings positioned between the gears and the gear box. The bearing rings are joined together by webs to form an unitary bearing ring structure.

6 Claims, 2 Drawing Figures

BEARING ARRANGEMENT FOR AXLE OR SHAFTS PROVIDED WITH ROTATING GEARS IN A DIFFERENTIAL GEAR BOX

BACKGROUND OF THE INVENTION

The present invention relates essentially to a bearing ring arrangement for axles or shafts provided with rotatable gears in a differential gear box.

Methods of providing a bearing surface for rotatable gears, e.g., a bevel gear in a differential gear box, have been known for many years. In one such method, bearing rings are arranged between the gears and an inner wall of the gear box. The bearing rings thus prevent the gears from contacting the inner wall of the gear box, thereby eliminating wear and tear on the gears. To maximize the operating life of the bearing rings, they have been heretofore manufactured from a wear-resistance material, such as a salt-bathed, face-hardened steel.

Conventionally, the bearing rings have been maintained loosely between the gears and the inner wall of the gear box in such a manner that they are capable of rotating with the gears. Rotation of the bearing rings is undesirable because it causes increased wear, and therefore decreases the operating life of the bearing rings.

A further disadvantage of the prior art bearing rings is that they are relatively difficult to assemble in the gear box. Assembly problems are especially prevalent when bevel gears are installed and supported in a spherical, shell-like differential gear box, whereby the loosely fitted bearing rings make assembly of the spindles and shafts carrying the bevel gears especially difficult.

SUMMARY OF THE INVENTION

It is an object of the present invention to provide a bearing ring arrangement, of the type providing a bearing surface between rotatable gears and an inner wall of a gear box, which avoids the difficulties and disadvantages of the prior art bearing ring arrangements noted above. This object, as well as other objects which will become apparent in the discussion that follows, are achieved, according to the present invention, by joining together the bearing rings with webs to form an unitary bearing ring structure. The unitary bearing ring structure eliminates entrainment of the bearing rings resulting from the rotation of the gears on their corresponding shafts, and therefore is an efficient and simple way of maintaining the bearing rings in position. Consequently, a substantial reduction in wear and tear on the bearing rings can be attained. Moreover, the unitary bearing ring structure facilitates assembly, and reduces the costs involved in producing several individual bearing rings.

Another aspect of the present invention involves manufacturing the unitary bearing ring structure, at least partially, from a synthetic plastic material, e.g., a 6,6 polyamide. A plastic material of this type can be easily worked into various shapes and configurations by a pressure injection molding process, and is also highly wear-resistant.

In accordance with one embodiment of the present invention, the gear box is in the form of a spherical shell containing rotatable bevel gears mounted on shafts extending through the gear box, the bearing rings being circularly shaped and joined together by the webs so that the unitary bearing ring structure is capable of forming a ring. The unitary bearing ring structure, in operation, may be either in the form of an endless ring or a split ring. In any event, the unitary bearing ring structure can be easily inserted into the gear box prior to the assembly of the individual bevel gears, thereby facilitating the subsequent mounting of the gears.

If desired, the bearing rings of the unitary bearing ring structure may be provided with perforations or slits which act as oil reservoirs to improve lubrication and prolong operating life.

BRIEF DESCRIPTION OF THE DRAWING

For a further understanding of the present invention, reference may be had to the accompanying drawing, in which.

DESCRIPTION OF THE PREFERRED EMBODIMENTS

Figure 1:
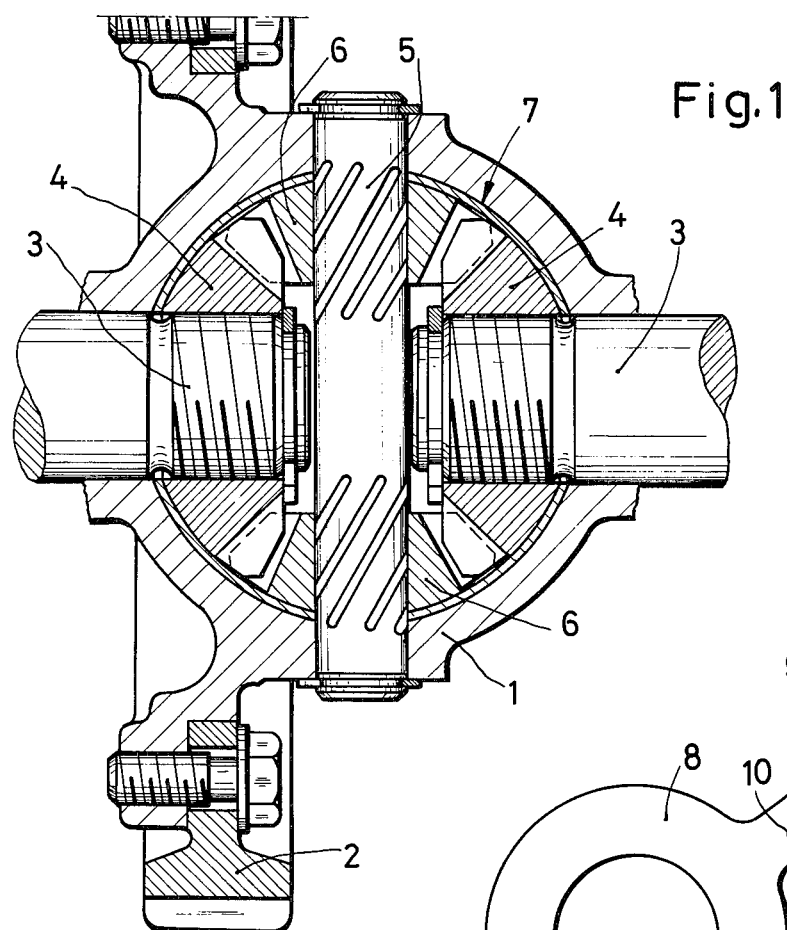
FIG. 1 is a cross-sectional view through a differential gear box having a unitary bearing ring structure arranged between the gear box and the bevel gears contained therein.

Referring now to the drawing, there is shown a differential gear arrangement for an automobile with front wheel drive including a differential gear box 1 in the form of a spherical shell and a spur gear 2 which is mounted by a flange on the gear box 1, the spur gear 2 being driven by a pinion (not shown). Rotatable shafts 3 projecting laterally from the gear box 1 carry bevel gears 4. The bevel gears 4 mesh with mating bevel gears 6 supported on a rotatable shaft 5 extending through the gear box 1 perpendicular to the shafts 3.

Figure 2:
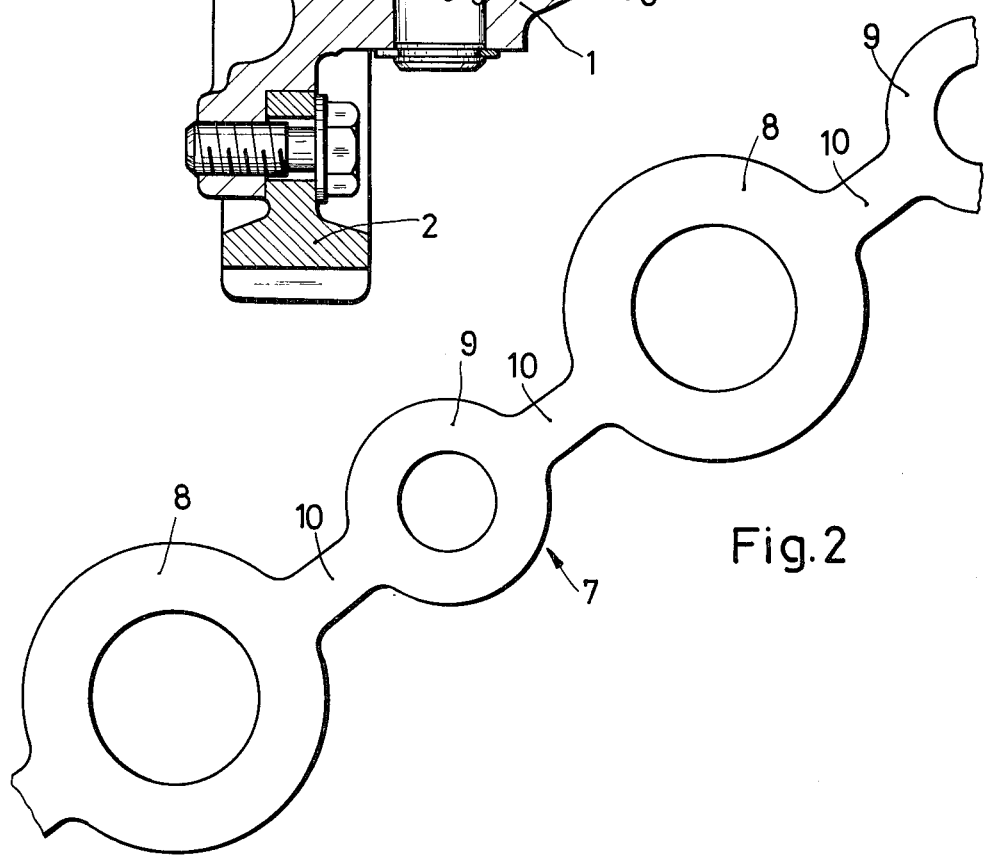
FIG. 2 is a plan view of the unitary bearing ring structure, it being rolled out flat.

A substantially circular unitary bearing ring structure 7 includes bearing rings 8 and 9 which are connected by webs 10 (see FIG. 2). In practice, the larger bearing rings 8 are associated with the bevel gears 4 and the smaller bearing rings 9 are associated with the bevel gears 6. The bearing rings 8 and 9 may be connected by the webs 10 so as to form an endless ring, or they may form a strip-like unit by cutting transversely through one of the webs 10. The strip-like unit, if employed, can be bent into a shape corresponding to the inner contour of the gear box 1 to form a split ring.

Because the bearing rings 8 and 9 are joined into the unitary bearing ring structure 7 by the webs 10, rotation of the bearing rings 8 and 9 with the bevel gears 4 and 6, respectively, is prevented. By preventing rotation, the bearing rings 8 and 9 of the unitary bearing ring structure 7 are not worn off between the bevel gears 4 and 6 and the inner wall of the gear box 1, as happens when individual bearing rings are utilized. A further advantage of the unitary bearing ring structure 7 is the reduction of construction costs achieved by the joint and simultaneous manufacture of all the bearing rings into an unitary structure. Construction costs may be further reduced by manufacturing the unitary bearing ring structure 7, at least partially, from a plastic material, preferably a thermostabilized 6,6 polyamide, which can be shaped by any suitable pressure injection molding method.

Utilization of the unitary bearing ring structure 7 also simplifies assembly of the differential gear. For example, when the unitary bearing ring structure 7 is initially set into the gear box 1, which may be in the form of a spherical shell, it automatically secures itself against the inner wall of the gear box 1. After the axle and shaft openings in the bearing rings 8 and 9 have been aligned, the shafts 3 carrying the bevel gears 4 are installed.

Following the insertion of the shaft 5, the bevel gears 6, which are supported on the shaft 5 in their proper position, are installed.

The bearing rings 8 and 9 of the unitary bearing ring structure 7 may be provided with perforations or slits which, during operation of the differential gear, form oil reservoirs that improve lubrication along the outer surfaces of the bevel gears 4 and 6.

In an alternate embodiment, the bearing rings 8 and 9 may be combined into a plurality of individual unitary structures. For example, the bearing rings 8 and 9 may be joined in pairs. Such an arrangement might be especially useful and advantageous for gear boxes with non-spherical shapes.

It will be understood that the described embodiments are merely exemplary and that persons skilled in the art may make many variations and modifications without departing from the spirit and scope of the invention. All such modifications and variations are intended to be included within the scope of the invention as defined in the appended claims.

We claim:

1. In a differential gear box containing rotatable gears mounted on shafts extending through the gear box and having bearing rings positioned between the gears and the gear box, each of the bearing rings encompassing a shaft of a respective gear, the improvement wherein each of the bearing rings is joined to at least one adjacent bearing ring by a web to form an unitary bearing ring structure which includes all the bearing rings, whereby entrainment of the bearing rings resulting from rotation of the gears on the shafts is prevented.

2. The differential gear box of claim 1, wherein the unitary bearing ring structure is at least partially plastic.

3. The differential gear box of claim 1, wherein the gear box is a spherical shell, the gears are bevel gears, and the bearing rings are circular and joined into an endless ring by the webs.

4. The differential gear box of claim 3, wherein the unitary bearing ring structure is divided by a transverse cut through one of the webs to form a split ring.

5. The differential gear box of claim 1, wherein the bearing rings include perforations, the perforations acting as oil reservoirs.

6. The differential gear box of claim 1, wherein the bearing rings include slits, the slits acting as oil reservoirs.

* * * * *